United States Patent
Okamoto

(10) Patent No.: US 6,216,991 B1
(45) Date of Patent: Apr. 17, 2001

(54) FOOT STRUCTURE FOR APPARATUS

(75) Inventor: Shinichiro Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/397,029

(22) Filed: Sep. 16, 1999

Related U.S. Application Data

(62) Division of application No. 08/943,697, filed on Oct. 3, 1997.

(30) Foreign Application Priority Data

Mar. 7, 1997 (JP) .................................... 9-053575

(51) Int. Cl.[7] .............................. F16M 11/20; E04B 1/98; E04H 9/02
(52) U.S. Cl. ....................... 248/188.1; 52/167.8
(58) Field of Search ................... 248/188.1, 562, 248/550, 581, 638, 636; 52/167.8, 167.7, 167.4; 361/682; 188/378, 266.1, 322.5, 380; 267/140.13, 135, 140.11, 219, 140.4

(56) References Cited

U.S. PATENT DOCUMENTS

| | | | |
|---|---|---|---|
| 2,359,000 | * 9/1944 | Rosenzweig | 248/21 |
| 2,359,915 | * 10/1944 | Hussman | 267/1 |
| 2,597,800 | * 5/1952 | Hussman | 248/20 |
| 2,661,913 | 12/1953 | Heizer et al. . | |
| 4,514,942 | 5/1985 | Pocanschi . | |
| 4,565,039 | 1/1986 | Oguro et al. . | |
| 4,650,167 | 3/1987 | Steiner et al. . | |
| 4,674,725 | 6/1987 | Popper . | |
| 4,703,911 | 11/1987 | Rammell . | |
| 4,731,966 | 3/1988 | Fujita et al. . | |
| 4,761,925 | * 8/1988 | Fukahori et al. | 52/167.7 |
| 4,830,346 | 5/1989 | Eberhard et al. . | |
| 4,887,398 | 12/1989 | Lenten . | |
| 4,991,366 | 2/1991 | Teramura et al. . | |
| 5,014,474 | * 5/1991 | Fyfe et al. | 52/167 |
| 5,028,039 | * 7/1991 | Sato | 267/140.1 |
| 5,310,017 | 5/1994 | Tobias . | |
| 5,344,116 | * 9/1994 | Winkler | 248/677 |

(List continued on next page.)

FOREIGN PATENT DOCUMENTS

| | | | |
|---|---|---|---|
| 4015213 | * 11/1990 | (DE) | 248/562 |
| 52-38752 | 3/1977 | (JP) . | |
| 0005551 | * 1/1983 | (JP) | 248/562 |
| 360211143 | * 10/1985 | (JP) | 52/167.8 |
| 0024048 | * 2/1987 | (JP) | 248/562 |
| 0169143 | * 7/1989 | (JP) | 248/562 |
| 401263335 | * 10/1989 | (JP) | 52/167.7 |
| 402101241 | * 4/1990 | (JP) | 52/167.8 |
| 402232463 | * 9/1990 | (JP) | 52/167.7 |
| 2-248549 | 10/1990 | (JP) . | |
| 2-248551 | 10/1990 | (JP) . | |
| 0051489 | * 3/1991 | (JP) | 52/167.7 |
| 403125751 | * 5/1991 | (JP) | 52/167.7 |
| 3-250694 | 11/1991 | (JP) . | |
| 3-272344 | 12/1991 | (JP) . | |
| 4-211196 | 8/1992 | (JP) . | |
| 5-99273 | 4/1993 | (JP) . | |

Primary Examiner—Anita M. King
Assistant Examiner—Jerome A. DeLuca
(74) Attorney, Agent, or Firm—Staas & Halsey LLP

(57) ABSTRACT

A foot structure for an apparatus including a bolt member and a slide cup. The bolt member has a first end fixed to the apparatus and a second end. The slide cup has, at an upper portion, a recess for slidably supporting the second end of the bolt member, and a lower portion fixed to a floor surface. An elastic member surrounds the bolt member, and is fixed to the apparatus and the slide cup. Horizontal movement of the bolt member in the slide cup is limited within the recess, thereby limiting the range of displacement of the apparatus relative to the floor surface.

1 Claim, 14 Drawing Sheets

U.S. PATENT DOCUMENTS

| | | | |
|---|---|---|---|
| 5,348,266 | * | 9/1994 | Gertel et al. ........................ 248/562 |
| 5,379,991 | * | 1/1995 | Delam et al. ....................... 248/562 |
| 5,452,548 | * | 9/1995 | Kwon ................................. 52/167.7 |
| 5,452,549 | | 9/1995 | Medeot et al. . |
| 5,456,047 | * | 10/1995 | Dorka ................................. 52/167.8 |
| 5,487,534 | * | 1/1996 | Sakamoto et al. ............... 267/141.1 |
| 5,559,671 | * | 9/1996 | Dan et al. ........................... 248/562 |
| 5,582,385 | * | 12/1996 | Boyle et al. ........................ 248/562 |
| 5,761,856 | * | 6/1998 | Kishizono et al. ................ 52/167.8 |
| 5,816,559 | * | 10/1998 | Fujimoto ............................ 248/636 |
| 5,964,327 | | 10/1999 | Shih . |

* cited by examiner

FOOT STRUCTURE FOR APPARATUS

This application is a divisional application of Ser. No. 08/943,697, filed Oct. 3, 1997.

BACKGROUND OF THE INVENTION

1. Field of the Invention

The present invention relates generally to a foot structure for an apparatus, and more particularly to an earthquake-resistant foot structure suitable for an electronic apparatus.

2. Description of the Related Art

When installing an electronic apparatus such as a computer in a building construction, it is important to take measures against an earthquake, so as to minimize falling of the apparatus and damage to the inside of the apparatus due to seismic vibrations. In conventional measures against an earthquake, a foot structure used in installing the apparatus in the building construction has had emphasis placed on increasing a mechanical strength thereof. Recently, however, attention is being given to a vibration isolating technique intended to reduce damage by efficiently converting vibration energy into another form of energy such as energy of movement.

FIG. 1A shows a conventional foot structure used in installing an apparatus 2 on a floor surface 4. The foot structure shown in FIG. 1A includes a bolt member 6 and a slide cup 8. The bolt member has a first end 6A and a second end 6B. The first end 6A is fixed to the apparatus 2. The slide cup 8 has at its upper portion a recess 8A for slidably supporting the second end 6B of the bolt member 6 and has at its lower portion a lower surface 8B slidable on the floor surface 4. When relatively small seismic vibrations are given to this foot structure, the bolt member 6 horizontally moves within the recess 8A of the slide cup 8, so that energy of the seismic vibrations is converted into energy of movement (or frictional heat), thus exerting a vibration isolating effect.

When large seismic vibrations are imparted to this earthquake-resistant foot structure, and the floor surface 4 is displaced in the direction of an arrow A as shown in FIG. 1B, not only the bolt member 6 moves within the recess 8A of the slide cup 8, but also the slide cup 8 itself horizontally slides on the floor surface 4, thereby obtaining a great vibration isolating effect by relative movement of the bolt member 6 and the slide cup 8 and relative movement of the slide cup 8 and the floor surface 4.

Further, another foot structure has been proposed (Japanese Patent Laid-open No. 5-99273). In this foot structure, the recess 8A of the slide cup 8 has a spherical surface, and the second end 6B of the bolt member 6 also has a spherical surface whose radius of curvature is smaller than that of the spherical surface of the recess 8A, thereby easily restoring the relative positional relation between the bolt member 6 and the slide cup 8 to an original state when seismic vibrations stop.

The conventional foot structure does not have a function of limiting the range of displacement of the apparatus relative to the floor surface. Accordingly, in the case that an earthquake having a large magnitude beyond expectation occurs for a long period of time, the apparatus moves, thus causing a collision between the apparatus and another apparatus or with a wall of the building construction. As a result, each apparatus or the building construction is damaged. Further, in the case that a man is present between the apparatus and the wall, a survival space for the man is lost.

Further, the conventional foot structure does not have a vertical vibration isolating effect to the apparatus.

Accordingly, when the apparatus receives vertical seismic vibrations, the bolt member may come out of the recess of the slide cup, so that the original performance of the slide cup cannot be exhibited.

Further, in the case that the floor surface, which is generally expected to be horizontal and flat is in fact uneven or inclined, there is a possibility of the bolt member escaping from the slide cup in the conventional foot structure so that the expected vertical vibration isolating effect cannot be exerted.

SUMMARY OF THE INVENTION

It is therefore an object of the present invention to provide a foot structure which can limit the range of displacement of an apparatus relative to a floor surface.

It is another object of the present invention to provide a foot structure having a vertical vibration isolating effect.

It is a further object of the present invention to provide a foot structure which can prevent the escape of a bolt member from a slide cup.

A first configuration of a foot structure for an apparatus according to the present invention comprises a bolt member, a slide cup, and a flange member. The bolt member has a first end and a second end. The first end of the bolt member is fixed to the apparatus. The slide cup has at its upper portion a recess for slidably supporting the second end of the bolt member an has at its lower portion a substantially flat lower surface and a rodlike projection projecting downward from a substantially central portion of the lower surface. The flange member has a slide surface with which the lower surface of the slide cup is in slidable contact and a wall surface projecting downward from the slide surface to define an opening space for accommodating the rodlike projection with play. The flange member is mounted on a substantially horizontal floor surface.

According to the first configuration, the slide cup and the flange member each having a specific shape are adopted, so that horizontal movement of the rodlike projection of the slide cup is limited within the opening space defined by the wail surface of the flange member. Accordingly, the range of displacement of the apparatus relative to the floor surface can be limited.

In accordance with another aspect of the first configuration according to the present invention, there is provided a foot structure for an apparatus, comprising a bolt member having a first end and a second end, said first end being fixed to said apparatus; and a slide cup having at its upper portion a recess for slidably supporting said second end of said bolt member and having at its lower portion a substantially flat lower surface and a rodlike projection accommodated with play in an opening space defined through a slide surface with which said lower surface is in slidable contact.

A second configuration of a foot structure for an apparatus according to the present invention comprises a bolt member, a slide cup, and an elastic member. The bolt member has a first end and a second end. The first end of the bolt member is fixed to the apparatus. The slide cup has at its upper portion a recess for slidably supporting the second end of the bolt member and has at its lower portion a lower surface contacting a substantially horizontal floor surface. The elastic member connects the apparatus and the floor surface.

According to the second configuration, the elastic member is combined with a support structure having the bolt member and the slide cup, so that horizontal movement of the bolt member relative to the slide cup is limited within the range of elastic deformation of the elastic member. Accordingly, the range of displacement of the apparatus relative to the floor surface can be limited. Furthermore, by the use of the elastic member, a vertical vibration isolating effect to the apparatus is produced, and the escape of the bolt member from the slide cup is suppressed.

In accordance with another aspect of the second configuration according to the present invention, there is provided a foot structure for an apparatus, comprising a support member for supporting said apparatus so as to allow oscillation; and an elastic member for connecting said apparatus and a substantially horizontal floor surface.

A third configuration of a foot structure for an apparatus according to the present invention comprises a bolt member, biasing means, and a slide cup. The bolt member comprises a first member and a second member. The first member is fixed to the apparatus, and one of the first member and the second member has a hole for loosely engaging the other. The biasing means biases the first member and the second member in opposite directions. The slide cup has at its upper portion a recess for slidably supporting the second member and has at its lower portion a lower surface slidable on a substantially horizontal floor surface.

According to the third configuration, by the use of the bolt member comprising the first member and the second member and the means for biasing the first member and the second member in opposite directions, a vertical vibration isolating effect to the apparatus is produced.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 2:
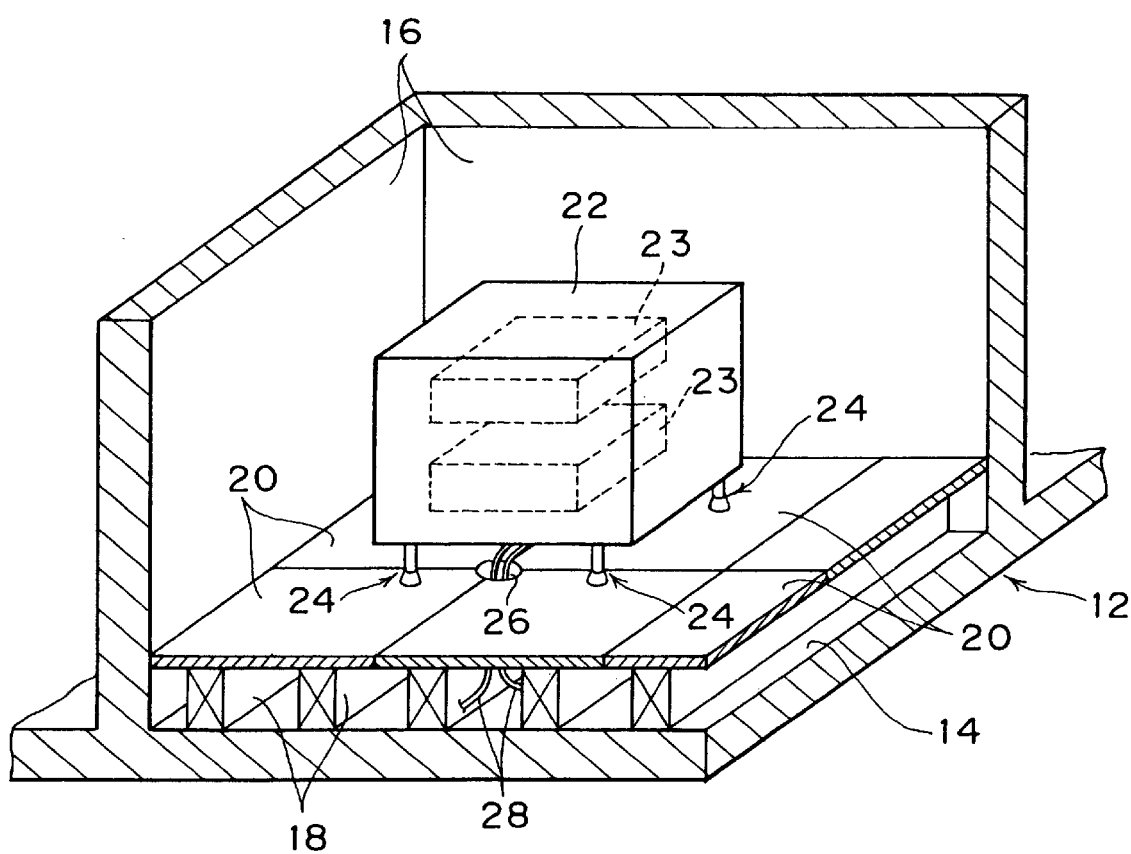
FIG. 2 is a perspective view showing a form of installation of an electronic apparatus to which the present invention is applicable.

FIG. 2 is a perspective view showing a form of installation of an electronic apparatus to which the present invention is applicable. In the following description, substantially the same parts will be denoted by the same reference numerals, and the description thereof may be omitted to avoid repetition.

There is defined a room used as a computer room or the like by a floor 14 and walls 16 of a building construction 12. A plurality of free access floors 20 are entirely laid over the floor 14 through supports 18 which are spread out substantially horizontally, so that an actual floor surface in this room is provided by these free access floors 20. Reference numeral 22 represents an electronic apparatus incorporating one or more electronic devices 23 such as computer units. Each electronic device 23 has an electronic circuit having a possibility of malfunction due to vibrations, for example. The electronic apparatus 22 is installed at its four lower corners on the free access floors 20 by means of foot structures 24 according to the present invention.

Cables 28 of the electronic apparatus 22 extend through an opening 26 formed through a joint portion of the free access floors 20 or through one of the free access floors 20 into a space defined between the free access floors 20 and the floor 14 of the building construction 12. By the use of the free access floors 20, scattering of the cables 28 in the room can be prevented, and the degree of freedom of installation form of the electronic apparatus 22 becomes large.

Figure 3:
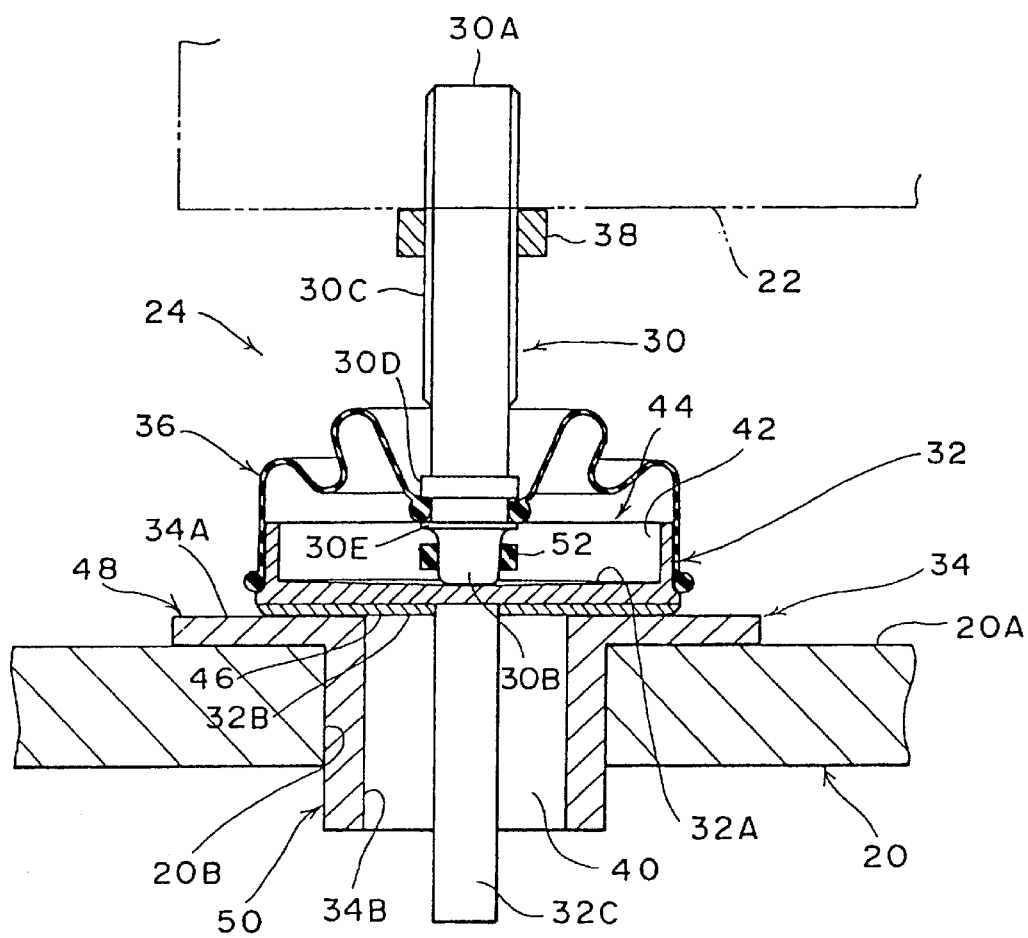
FIG. 3 is a sectional view of a foot structure showing a first preferred embodiment of the present invention.

FIG. 3 is a sectional view of a foot structure showing a first preferred embodiment of the present invention. More specifically, FIG. 3 shows a sectional configuration of each of the foot structures 24 shown in FIG. 2. Each foot structure 24 includes a bolt member 30, a slide cup 32, a flange member 34; and a cover 36 (not shown in the other figures) detachably mounted on the bolt member 30 and the slide cup 32 to cover the slide cup 32.

The bolt member 30 has a first end 30A and a second end 30B respectively corresponding to an upper portion and a lower portion of the bolt member 30. The upper portion corresponding to the first end 30A of the bolt member 30 is formed with a threaded portion 30C. The bolt member 30 is fixed at the first end 30A to the electronic apparatus 22 by threadedly engaging the threaded portion 30C with a nut (not shown) formed on the inner surface of a housing of the electronic apparatus 22 or an inside nut (not shown) provided in the electronic apparatus 22 and tightening either nut to an outside nut 38. By rotating the bolt member 30 in a loosened condition of the outside nut 38 to thereby vertically advance or retract the bolt member 30, the projecting length of the bolt member 30 from the bottom surface of the electronic apparatus 22 can be adjusted to thereby adjust the support height of the electronic apparatus 22.

The slide cup 32 has at its upper portion a recess 32A for slidably supporting the second end 30B of the bolt member 30, and has at its lower portion a substantially flat lower surface 32B and a rodlike projection 32C projecting downward from a substantially central portion of the lower surface 32B.

The flange member 34 has a substantially horizontal slide surface 34A with which the lower surface 32B of the slide cup 32 is in slidable contact and a wall surface 34B projecting downward from the slide surface 34A to define an opening space 40 for accommodating the rodlike projection 32C with play.

More specifically, the slide cup 32 comprises a cup body 44 having an annular projection (wall portion) 42 for providing the recess 32A and a liner 46 provided on the bottom surface of the cup body 44 except the rodlike projection 32C. The lower surface 32B of the slide cup 32 is provided by the liner 46. The rodlike projection 32C is formed integrally with the cup body 44, thereby ensuring a sufficient strength.

More specifically, the flange member 34 comprises a platelike portion 48 for providing the slide surface 34A and a cylindrical portion 50 for providing the wall surface 34B. The platelike portion 48 is a disk-shaped portion having an outer diameter larger than the outer diameter of the slide cup 32 and an inner diameter smaller than the outer diameter of the slide cup 32. The platelike portion 48 and the cylindrical portion 50 are formed integrally with each other.

In this preferred embodiment, the upper surface 20A of each free access floor 20 constitutes a floor surface, so that the following structure is provided to mount the flange member 34 on the floor surface 20A. That is, the free access floor 20 has a hole 20B having a diameter larger than the outer diameter of the cylindrical portion 50 and smaller than the outer diameter of the platelike portion 48. The cylindrical portion 50 is inserted through the hole 20B, so that the flange member 34 is positioned with respect to the free access floor 20. With this structure, the flange member 34 can be mounted on the floor surface 20A only by a simple operation of inserting the cylindrical portion 50 into the hole 20B of the free access floor 20.

It is now assumed that an earthquake has occurred to cause vibrations of the free access floor 20 in a horizontal direction (lateral direction as viewed in FIG. 3). In the case that the amplitude of the seismic vibrations is relatively small, the second end 30B of the bolt member 30 slides relative to the recess 32A of the slide cup 32, thereby exerting a horizontal vibration isolating effect. When the amplitude of the seismic vibrations becomes large to cause collision of the bolt member 30 with the wall portion 42 of the slide cup 32, the slide cup 32 slides relative to the slide surface 34A of the flange member 34, thereby exerting a horizontal vibration isolating effect. The allowable range of relative sliding of the slide cup 32 in this case is limited within a predetermined circular area because the rodlike projection 32C is accommodated in the opening space 40 with play. Thus, according to this preferred embodiment, the range of displacement of the electronic apparatus 22 relative to the floor surface 20A is limited, so that there is no possibility of collision of the electronic apparatus 22 with the walls 16 or the like in the building construction 12 (see FIG. 2) upon occurrence of a great earthquake.

As mentioned above, the bolt member 30 starts to slide relative to the slide cup 32 before the slide cup 32 starts to slide relative to the flange member 34 according to the amplitude of the seismic vibrations. To effect this operation, a first friction coefficient between the second end 30B of the bolt member 30 and the recess 32A is set smaller than a second friction coefficient between the lower surface 32B of the slide cup 32 and the slide surface 34A of the flange member 34 in this preferred embodiment. More specifically, the bolt member 30 is formed of metal such as steel, and the second end 30B has a spherical surface.

The radius of curvature of the second end 30B of the bolt member 30 is in the range of preferably 30 mm to 40 mm, because if the radius of curvature is too small, the second end 30B becomes prone to wear, whereas if the radius of curvature is too large, the first friction coefficient becomes too large to result in a problem that a desired operation cannot be obtained.

Owing to the material of the bolt member 30 and the shape of the second end 30B as mentioned above, a relatively small value of the first friction coefficient can be obtained. A target value of the first friction coefficient is 0.1, for example.

A target value of the second friction coefficient is set to 0.2, for example. To this end, a self-lubricating material such as Teflon (registered trademark of DuPont) or nylon is adopted as the material of the liner 46. Further, metal such as steel is adopted as the material of the flange member 34, and the slide surface 34A of the flange member 34 is flat.

In this preferred embodiment, the recess 32A of the slide cup 32 has a shape such that the recess 32A is deepest at its central portion corresponding to the rodlike projection 32C and gradually shallowed from the central portion toward the radially outermost portion. A target value of the angle of slant of the recess 32A is 1°, for example. Owing to such a shape of the recess 32A, the bolt member 30 can be easily returned to the deepest central portion of the recess 32A by slight seismic vibrations occurring prior to the end of an earthquake.

The cover 36 for covering the slide cup 32 is formed of a flexible material such as rubber. The cover 36 has at its substantially central portion a hole for insertion of the bolt member 30 in a sealed condition. Further, the outer circumference of the cover 36 is in tight contact with the outer side surface of the slide cup 32. To maintain an inserted condition of the bolt member 30 through the hole of the cover 36, the bolt member 30 has two large-diameter portions 30D and 30E between the second end 30B and the threaded portion 30C. Thus, there is defined an enclosed space by the cover 36 and the slide cup 32. Accordingly, the first friction coefficient can be easily maintained at a stable value. In other words, it is possible to prevent aged deterioration of the first friction coefficient due to deposition of dust on the recess 32A.

In this preferred embodiment, an elastic ring 52 formed of rubber or the like is engaged with the bolt member 30 in the vicinity of the second end 30B, so as to absorb shock when the bolt member 30 is about to collide with the wall portion 42 of the slide cup 32. Accordingly, malfunction of the electronic devices 23 (see FIG. 2) due to application of undesired shock to the electronic apparatus 22 can be prevented. For example, it is possible to prevent malfunction due to tracking error in a mechanical recording device such as a hard disk drive or noise caused by movement of a mechanical contact such as a connector provided on a printed board.

While the flange member 34 is simply fitted with the free access floor 20 in the preferred embodiment shown in FIG. 3, the flange member 34 may be fixed to the free access floor 20 by means of screws or adhesive for the purpose of more firmly mounting the flange member 34 on the floor surface 20A.

Figure 4:
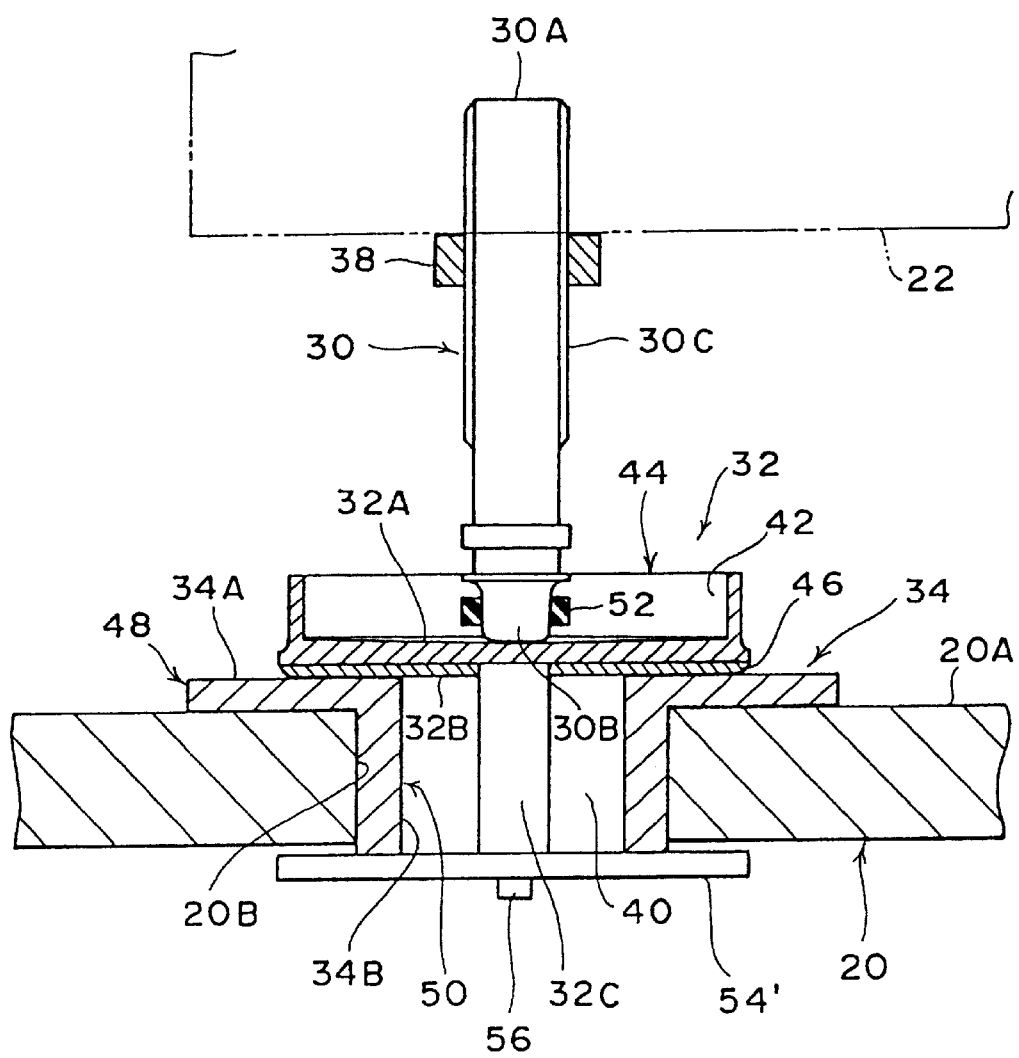
FIG. 4 is a sectional view of a foot structure showing a second preferred embodiment of the present invention.

FIG. 4 is a sectional view of a foot structure showing a second preferred embodiment of the present invention. In contrast with the foot structure shown in FIG. 3, the foot structure of this preferred embodiment is characterized in that it further includes a plate member 54' fixed to the lower end of the rodlike projection 32C of the slide cup 32. The plate member 54' is fixed to the rodlike projection 32C by means of a screw 56. The plate member 54' is formed from a steel plate, for example, and has a diameter larger than the diameter of the hole 20B of the free access floor 20.

By the addition of the plate member 54', the placement of the flange member 34 to the free access floor 20 can be made stable. That is, since the plate member 54' is larger in diameter than the hole 20B of the free access floor 20, it is possible to obtain a structure such that the free access floor 20 is sandwiched between the plate member 54' and the platelike portion 48 of the flange member 34. As a result, even when the rodlike projection 32C of the slide cup 32 comes into collision with the cylindrical portion 50 of the flange member 34 upon occurrence of an earthquake, the bolt member 30 does not escape from the slide cup 32.

Furthermore, according to this structure, there is no possibility of disengagement of the flange member 34 from the free access floor 20 even without the use of screws or the like for fixing the flange member 34 to the free access floor 20. Preferably, the lower end of the cylindrical portion 50 of the flange member 34 slightly projects from the lower surface of the free access floor 20 to such a degree that the plate member 54' does not contact the lower surface of the free access floor 20.

For the purpose of facilitating horizontal movement of the slide cup 32 relative to the flange member 34 upon occurrence of an earthquake, a lubricant or an equivalent member may be applied or attached to the lower end of the cylindrical portion 50 of the flange member 34 or the upper surface of the plate member 54'.

Figure 5:
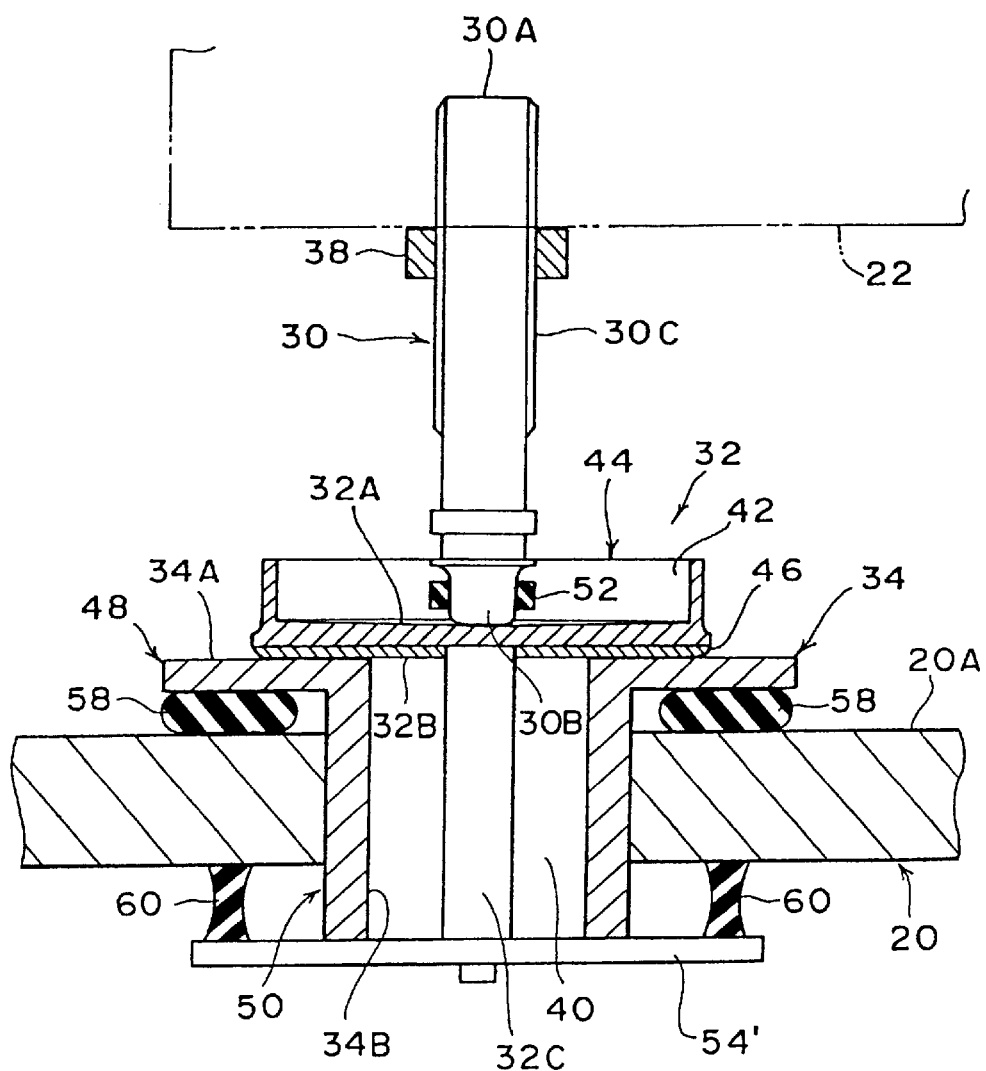
FIG. 5 is a sectional view of a foot structure showing a third preferred embodiment of the present invention.

FIG. 5 is a sectional view of a foot structure showing a third preferred embodiment of the present invention. In contrast with the foot structure shown in FIG. 4, the foot structure of this preferred embodiment is characterized in that a single (ringlike) or plural elastic members 58 are interposed between the platelike portion 48 of the flange member 34 and the floor surface 20A, and a single (ringlike) or plural elastic members 60 are interposed between the lower surface of the free access floor 20 and the plate member 54'. The elastic members 58 and 60 are formed of rubber, for example. FIG. 5 shows that the elastic members 58 are in a contracted condition given by a compressive force and the elastic members 60 are in a stretched condition given by a tensile force. With this structure, the flange member 34 is allowed to vertically move relative to the free access floor 20 upon occurrence of an earthquake, thereby producing a vertical vibration isolating effect to the electronic apparatus 22.

According to the third preferred embodiment shown in FIG. 5, it is possible to provide a foot structure which can limit the range of displacement of the apparatus relative to the floor surface and can exert a vertical vibration isolating effect to the apparatus.

Figure 6:
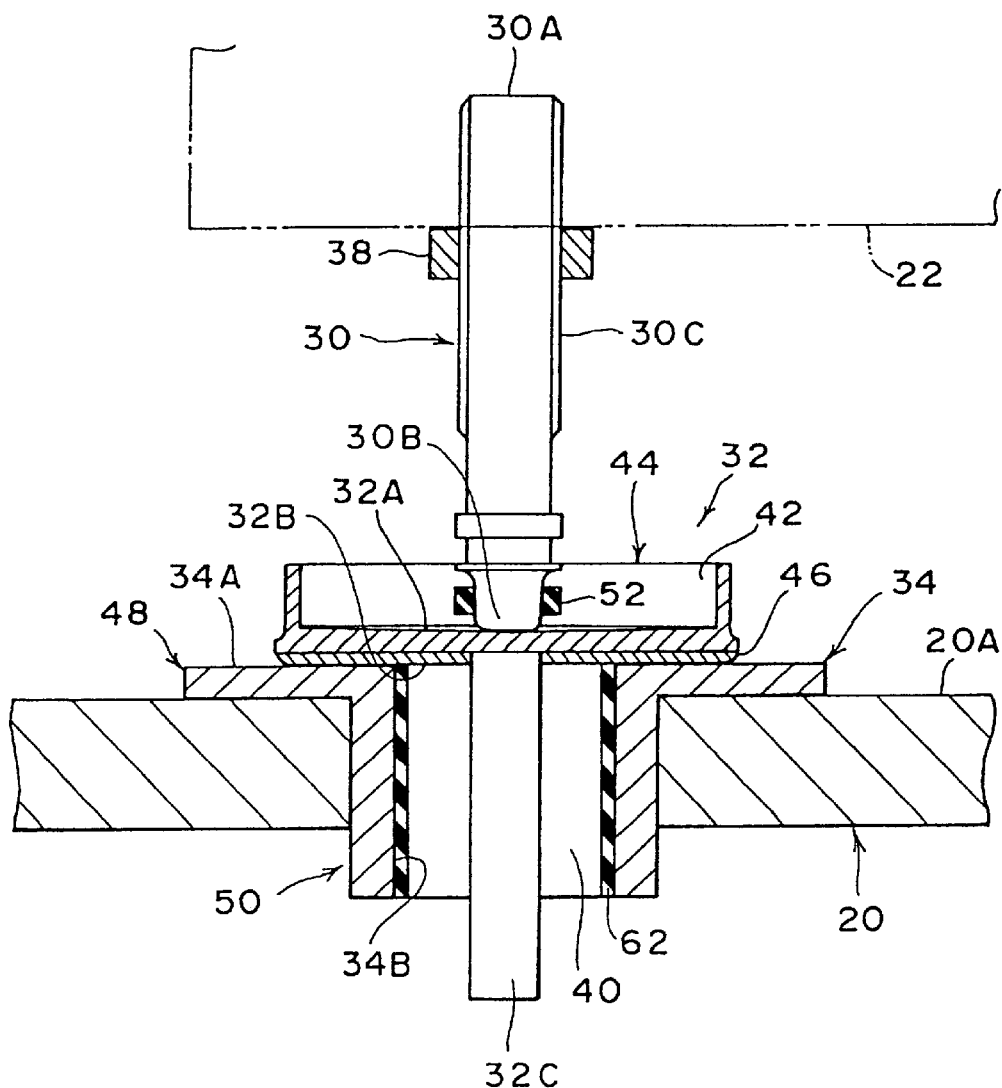
FIG. 6 is a sectional view of a foot structure showing a fourth preferred embodiment of the present invention.

FIG. 6 is a sectional view of a foot structure showing a fourth preferred embodiment of the present invention. In contrast with the foot structure shown in FIG. 3, the foot structure of this preferred embodiment is characterized in that it further includes an elastic sheet 62 attached to the wall surface 34B of the flange member 34. The elastic sheet 62 is formed of rubber, for example. According to this preferred embodiment, the elastic sheet 62 functions to absorb shock when the rodlike projection 32C of the slide cup 32 is about to collide with the wall surface 34B of the flange member 34 upon occurrence of an earthquake. Accordingly, the horizontal vibration isolating effect can be enhanced, and malfunction or the like of the electronic devices 23 (see FIG. 2) incorporated in the electronic apparatus 22 can be prevented.

Figure 7:
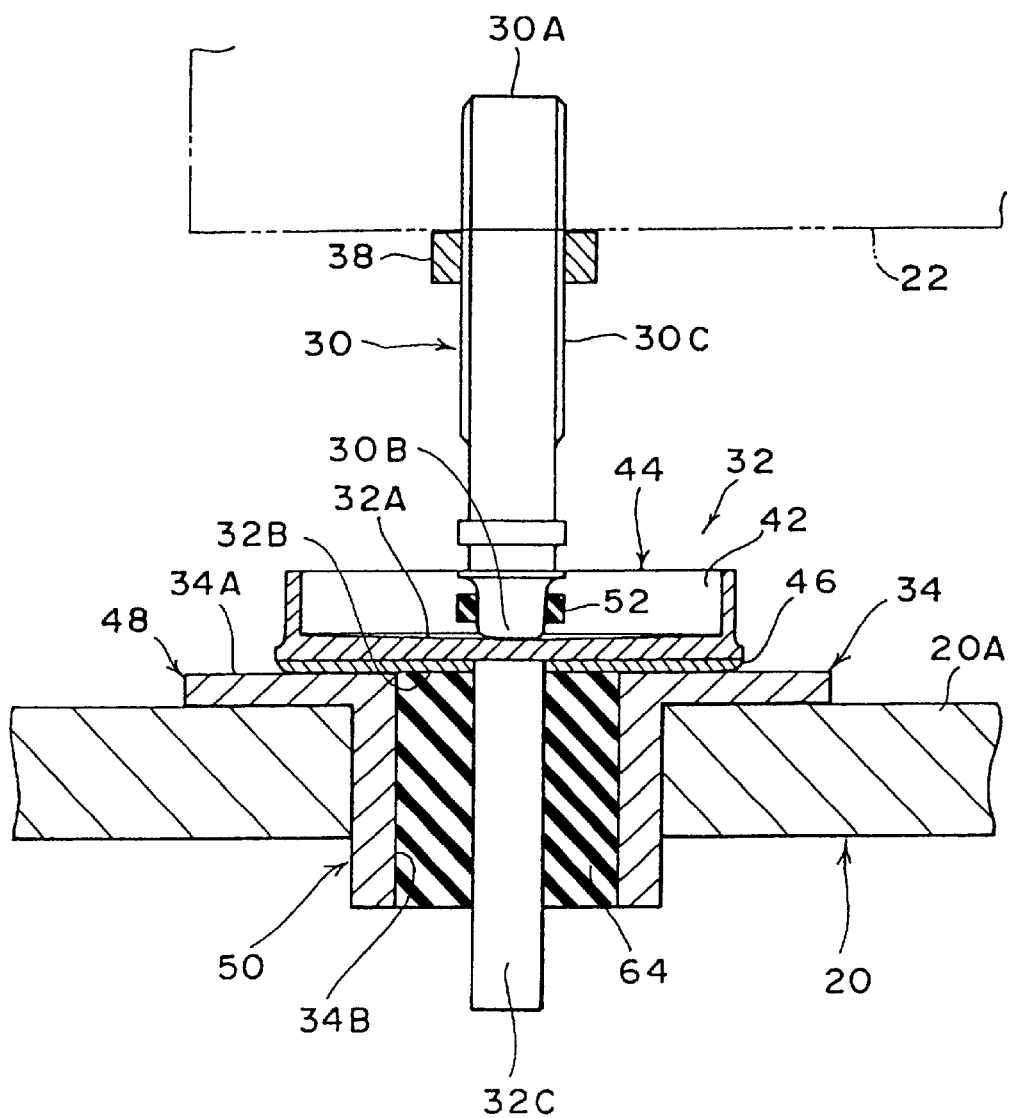
FIG. 7 is a sectional view of a foot structure showing a fifth preferred embodiment of the present invention.

FIG. 7 is a sectional view of a foot structure showing a fifth preferred embodiment of the present invention. The foot structure of this preferred embodiment is characterized in that an elastic block 64 formed of rubber or the like is used in place of the elastic sheet 62 shown in FIG. 6. The elastic block 64 is interposed between the wall surface 34B of the flange member 34 and the rodlike projection 32C of the slide cup 32, and is fixed therebetween by adhesion, for example. According to this foot structure as similar to the foot structure shown in FIG. 6, the elastic block 64 functions to absorb shock when the rodlike projection 32C of the slide cup 32 is about to collide with the wall surface 34B of the flange member 34. Accordingly, the horizontal vibration isolating effect can be enhanced, and malfunction or the like of the electronic devices 23 incorporated in the electronic apparatus 22 can be prevented.

In the preferred embodiment shown in FIG. 6 or 7, it is preferable to select a material having a small elastic coefficient as the material of the elastic sheet 62 or the elastic block 64, so as to damp an impact force proportional to a velocity change when the rodlike projection 32C of the slide cup 32 is about to collide with the wall surface 34B of the flange member 34.

All of the above-mentioned preferred embodiments are included in the first configuration of the foot structure of the present invention.

There will now be described two preferred embodiments included in the second configuration of the foot structure of the present invention with reference to FIGS. 8 and 9.

Figure 8:
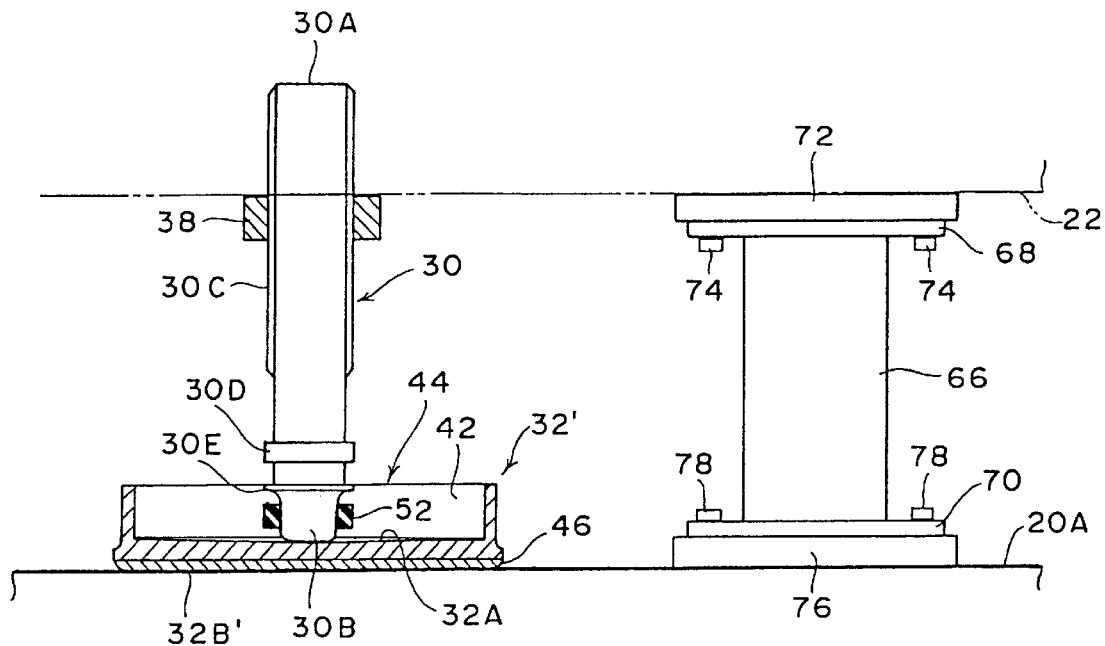
FIG. 8 is a sectional view of a foot structure showing a sixth preferred embodiment of the present invention.

FIG. 8 is a sectional view of a foot structure showing a sixth preferred embodiment of the present invention. This foot structure includes a bolt member 30 whose first end 30A is fixed to the electronic apparatus 22, a slide cup 32' having a recess 32A for slidably supporting a second end 30B of the bolt member 30, and a solid cylindrical elastic member 66 for connecting the electronic apparatus 22 and the floor surface 20A.

In this preferred embodiment, the slide cup 32' has a form such that the rodlike projection 32C has been removed from the slide cup 32 in the first preferred embodiment shown in FIG. 3. In association therewith, a liner 46 is provided on the entirety of the lower surface of the cup body 44. As a result, a substantially flat lower surface 32B' of the slide cup 32' is provided by the liner 46, and the slide cup 32' is slidable on the floor surface 20A.

The elastic member 66 is fixed to the electronic apparatus 22 and the floor surface 20A at a position different from the position of the bolt member 30. More specifically, the elastic member 66 is formed of rubber or the like, and brackets 68 and 70 are provided at the upper and lower ends of the elastic member 66. The bracket 68 is fixed through a base 72 to the electronic apparatus 22 by means of bolts 74, and the bracket 70 is fixed through a base 76 to the floor surface 20A by means of bolts 78.

Figure 1A:
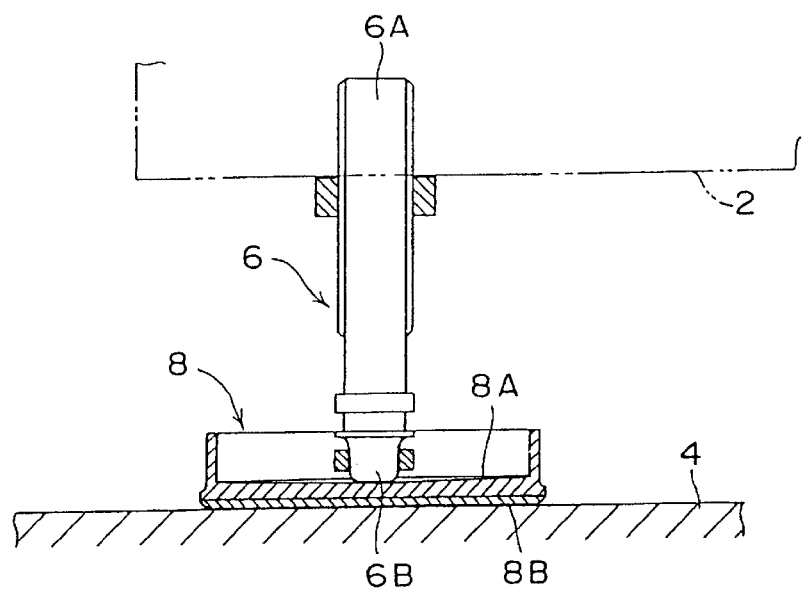
FIGS. 1A and 1B are sectional views of a foot structure in the related art.
Figure 1B:
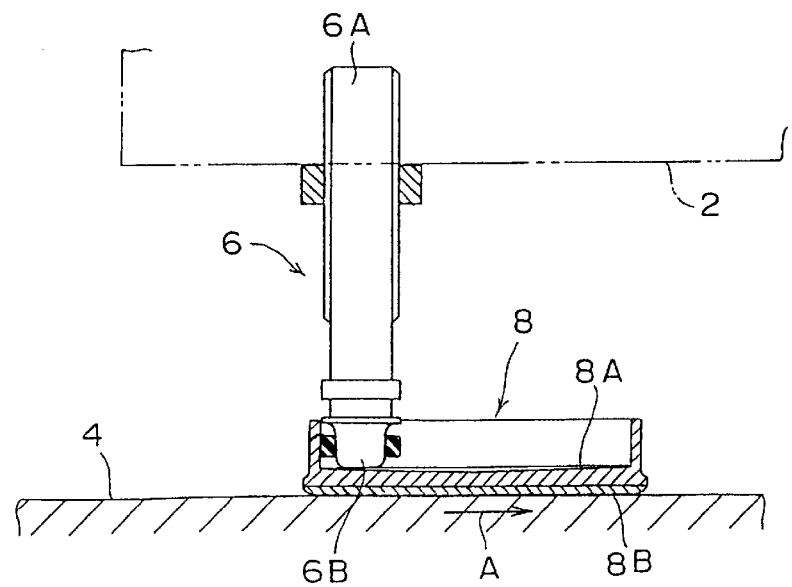

The operation of the bolt member 30 and the slide cup 32' in this preferred embodiment should be understandable according to the related art shown in FIGS. 1A and 1B, so the description thereof will be omitted herein. According to this preferred embodiment, the electronic apparatus 22 and the floor surface 20A are connected by the elastic member 66, so that the displacement of the electronic apparatus 22 relative to the floor surface 20A is limited within the allowable range of elastic deformation of the elastic member 66, thus achieving one of the objects of the present invention. Further, by the use of the elastic member 66, a vertical vibration isolating effect to the electronic apparatus 22 is produced, and the escape of the bolt member 30 from the slide cup 32' is prevented. Additionally, the bolt member 30 and the slide cup 32' can be selected from conventional ones, so that the second configuration of the foot structure of the present invention can be easily provided.

Figure 9:
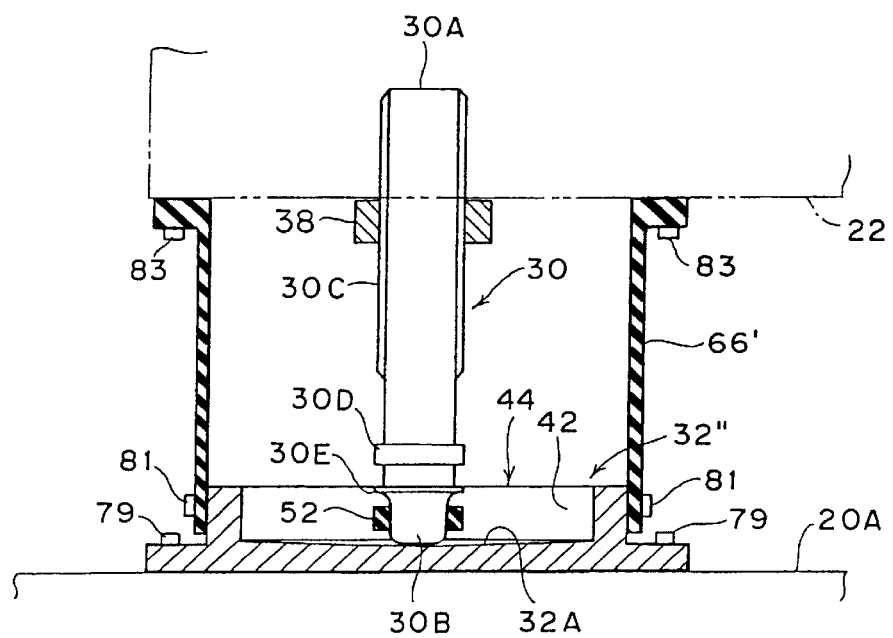
FIG. 9 is a sectional view of a foot structure showing a seventh preferred embodiment of the present invention.

FIG. 9 is a sectional view of a foot structure showing a seventh preferred embodiment of the present invention. In contrast with the preferred embodiment shown in FIG. 8 employing the solid cylindrical elastic member 66 provided at a position different from the position of the bolt member 30, the preferred embodiment shown in FIG. 9 is characterized in that a hollow cylindrical elastic member 66' for connecting the electronic apparatus 22 and the floor surface 20A is provided so as to surround the bolt member 30. Further, a slide cup 32" is fixed to the floor surface 20A by means of bolts 79.

More specifically, the slide cup 32" has a form such that the liner 46 has been removed from the slide cup 32' shown in FIG. 8, that is, the slide cup 32" is identical with the cup body 44 itself. Such a form of the slide cup 32" provides a recess 32A for slidably supporting the second end 30B of the bolt member 30. The lower end of the hollow cylindrical elastic member 66' is fixed to the slide cup 32" at its wall portion 42 by means of bolts 81, and the upper end of the elastic member 66' is fixed to the electronic apparatus 22 by means of bolts 83. Thus, the elastic member 66' is fixed to the slide cup 32" and the electronic apparatus 22, thereby defining an enclosed space inside the elastic member 66' to prevent deposition of dust on the recess 32A causing hindrance against a desired operation.

According to this preferred embodiment, the displacement of the electronic apparatus 22 to the floor surface 20A is limited within the allowable range of elastic deformation of the elastic member 66', thereby achieving one of the objects of the present invention. Further, the electronic apparatus 22 and the slide cup 32" are connected by the elastic member 66', and the slide cup 32" is fixed to the floor surface 20A. Accordingly, a vertical vibration isolating effect to the electronic apparatus 22 upon occurrence of an earthquake is produced. Further, there is no possibility of the escape of the bolt member 30 from the slide cup 32" upon occurrence of an earthquake.

In the preferred embodiment shown in FIG. 9, the elastic member 66' is formed of rubber, so that the enclosed space inside the elastic member 66' can be reliably sealed.

The second configuration of the foot structure of the present invention is not limited to the preferred embodiment shown in FIG. 8 or the preferred embodiment shown in FIG. 9. For example, a plurality of platelike or rodlike elastic members may be used to connect the electronic apparatus 22 and the slide cup 32" on the basis of the preferred embodiment shown in FIG. 9. Although a sealing effect cannot be obtained by the elastic members in this case, the other effects are similar to those of the preferred embodiment shown in FIG. 9.

Some preferred embodiments included in the third configuration of the foot structure of the present invention will now be described.

Figure 10A:
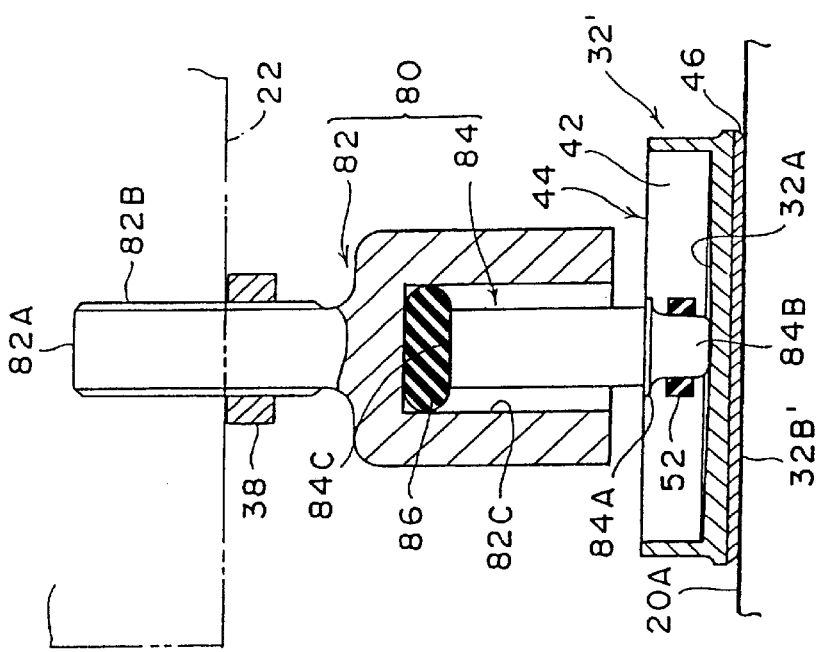
FIGS. 10A and 10B are sectional views of a foot structure showing an eighth preferred embodiment of the present invention.
Figure 10B:
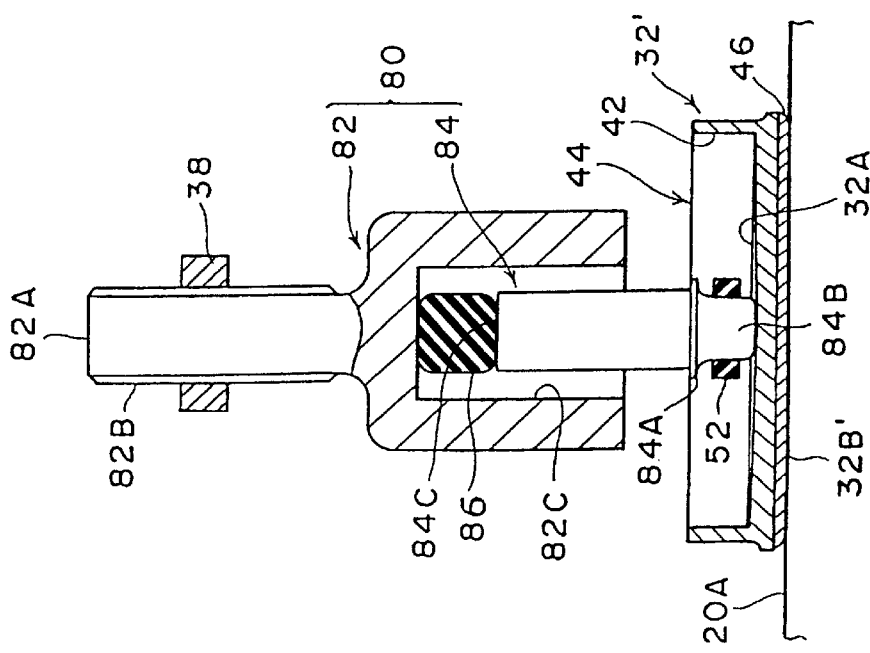

FIGS. 10A and 10B are sectional views of a foot structure showing an eighth preferred embodiment of the present invention. FIG. 10B shows a condition where the foot structure is mounted to the electronic apparatus 22, and FIG. 10A shows a condition where the foot structure has been removed from the electronic apparatus 22. Unlike the previous preferred embodiments, this preferred embodiment employs a bolt member 80 composed of a first member 82 and a second member 84 as separate members.

The first member 82 has an upper end 82A and a threaded portion 82B respectively corresponding to the first end 30A and the threaded portion 30C of the bolt member 30 (see FIG. 3, for example). The second member 84 has a large-diameter portion 84A and a lower end 84B respectively corresponding to the large-diameter portion 30E and the second end 30B of the bolt member 30. The first member 82 further has a hole 82C for loosely engaging a part of the second member 84 which is substantially solid cylindrical. The lower end 84B of the second member 84 is slidably supported by a recess 32A of a slide cup 32' similar to that in the sixth preferred embodiment shown in FIG. 8. The lower surface 32B' of the slide cup 32' is slidable relative to the floor surface 20A. The lower surface 32B' is provided by a liner 46. A rubber block 86 having a substantially spherical shape, for example, is interposed between the top surface in the hole 82C of the first member 82 and the upper end 84C of the second member 84, so as to bias the first member 82 and the second member 84 in opposite directions.

When the foot structure of this preferred embodiment is mounted to the electronic apparatus 22, the rubber block 86 is elastically deformed by the weight of the electronic apparatus 22 to become a compressed condition shown in FIG. 10B. On the other hand, when this foot structure is demounted from the electronic apparatus 22, the rubber block 86 restores its original shape as shown in FIG. 10A.

In contrast with the related art shown in FIGS. 1A and 1B, this preferred embodiment has the following feature. That is, since the first member 82 and the second member 84 constituting the bolt member 80 are biased in opposite directions by the rubber block 86, a vertical vibration isolating effect to the electronic apparatus 22 in addition to a horizontal vibration isolating effect thereto can be produced. Accordingly, even when the electronic apparatus 22 is largely vibrated in the vertical direction, the bolt member 80 is prevented from jumping the wall portion 42 because the second member 84 is pressed against the slide cup 32' by the rubber block 86. Thus, according to this preferred embodiment, one of the objects of the present invention can be achieved.

Figure 11:
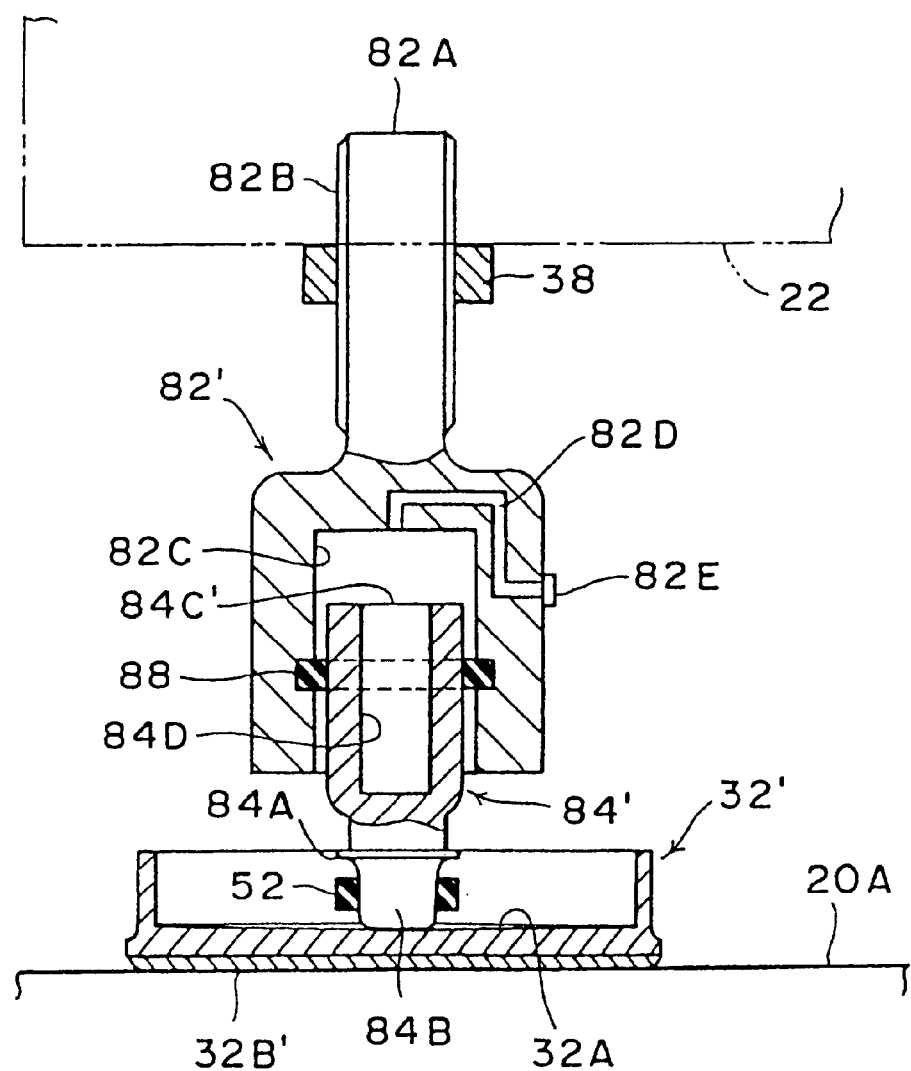
FIG. 11 is a sectional view of a foot structure showing a ninth preferred embodiment of the present invention.

FIG. 11 is a sectional view of a foot structure showing a ninth preferred embodiment of the present invention. This preferred embodiment employs an air spring provided by the air charged in the hole 82C in place of the rubber block 86 shown in FIG. 10. More specifically, the bolt member in this preferred embodiment is composed of a first member 82' and a second member 84'. The first member 82' has an air passage 82D for making communication of the hole 82C and the outside and a valve 82E for discharging excess air from the hole 82C through the air passage 82D or supplying a lacking amount of air into the hole 82C through the air passage 82D. The second member 84' is formed at its upper portion with a hole 84D opening to the upper end 84C' for the purpose of enlarging the substantial volume of the air spring. Further, to prevent air leakage from the hole 82C of the first member 82', a rubber ring 88 is fitted with an annular groove formed on the cylindrical surface of the hole 82C, and the second member 84' is inserted into the center hole of the rubber ring 88.

According to this preferred embodiment, the first member 82' and the second member 84' are biased in opposite directions by the air spring. Accordingly, a vertical vibration isolating effect can be produced as similarly to the preferred embodiment shown in FIGS. 10A and 10B. In particular, by the use of the air spring, air pressure inside the hole 82C can be adjusted by the valve 82E, thereby easily obtaining a desired biasing force. Further, since the hole 84D is formed in the second member 84' to enlarge the substantial volume of the air spring, the air spring for providing a required biasing force can be reduced in size, and a small-sized foot structure can therefore be provided.

Figure 12:
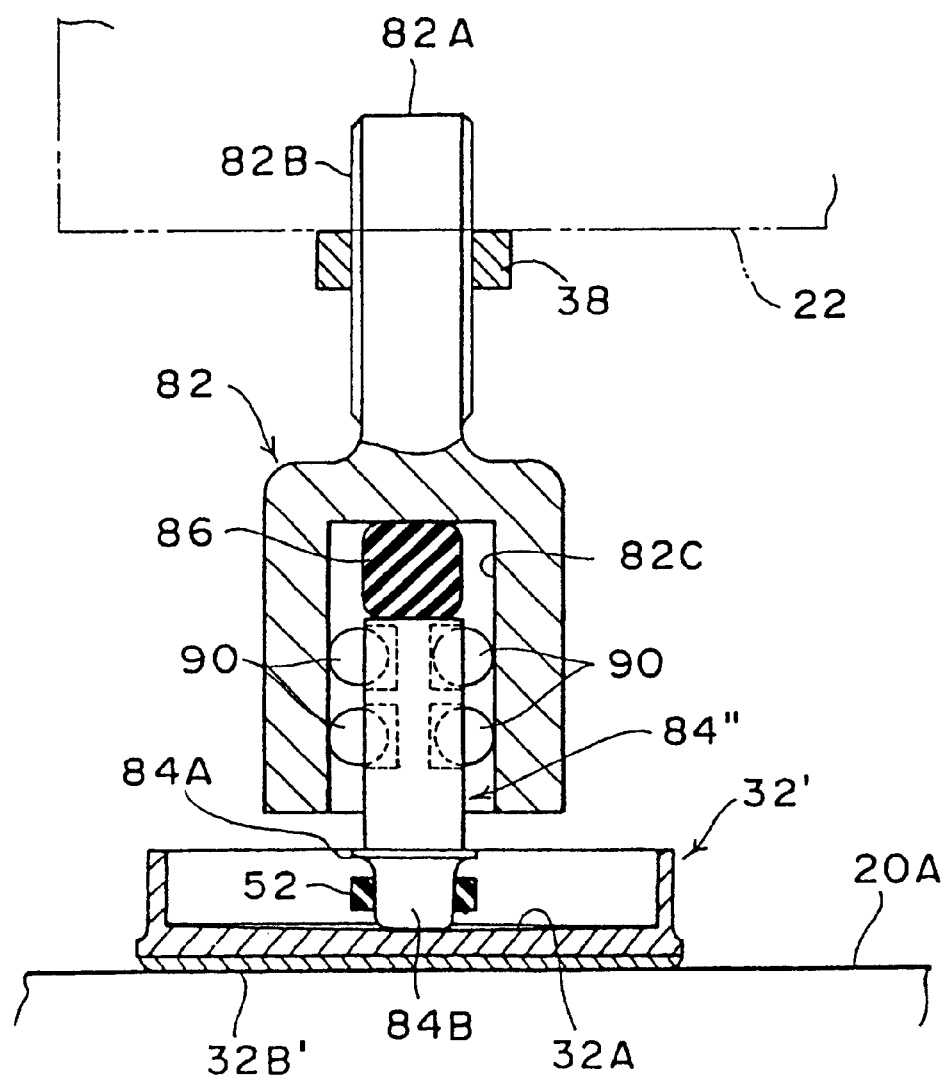
FIG. 12 is a sectional view of a foot structure showing a tenth preferred embodiment of the present invention.

FIG. 12 is a sectional view of a foot structure showing a tenth preferred embodiment of the present invention. In contrast with the foot structure shown in FIGS. 10A and 10B, the foot structure of this preferred embodiment is characterized in that a plurality of steel balls 90 are additionally provided in the hole 82C of the first member 82. A second member 84" having a plurality of recesses for respectively receiving the steel balls 90 at their substantially half portions is used to prevent falling of the steel balls 90. Each steel ball 90 is allowed to roll between the cylindrical surface of the hole 82C of the first member 82 and the inside surface of the corresponding recess of the second member 84", thereby reducing friction between the first member 82 and the second member 84". As a result, the first member 82 can be moved vertically smoothly relative to the second member 84" upon occurrence of an earthquake.

Figure 13:
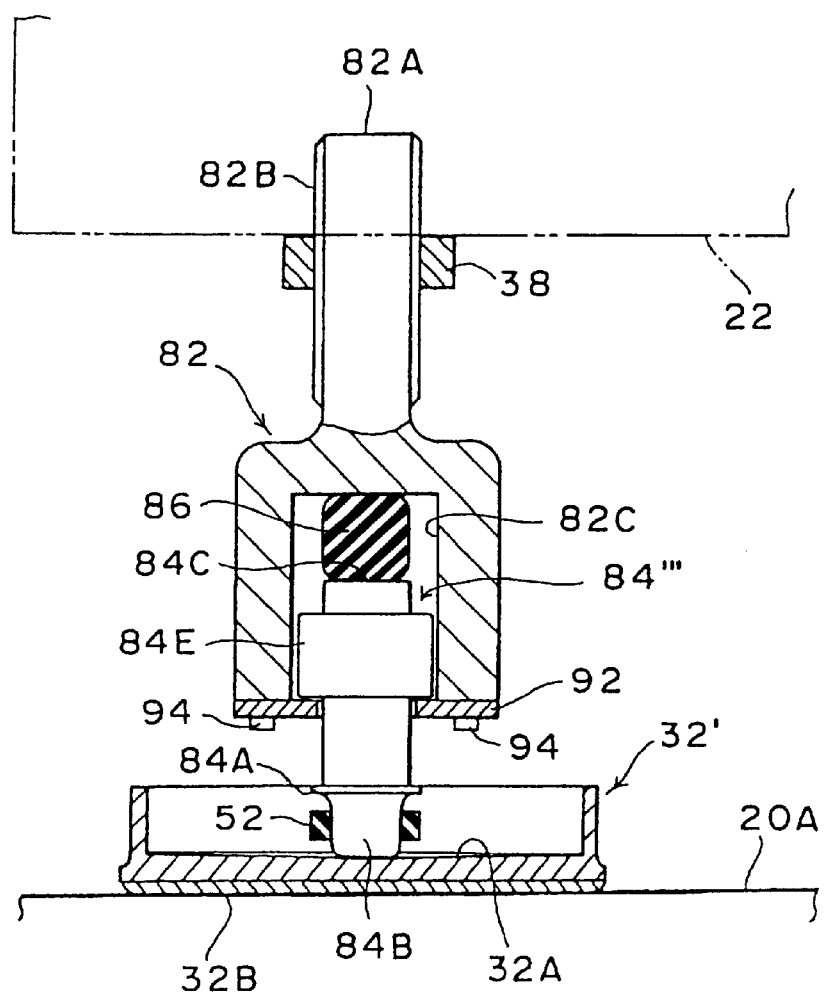
FIG. 13 is a sectional view of a foot structure showing an eleventh referred embodiment of the present invention.

FIG. 13 is a sectional view of a foot structure showing an eleventh preferred embodiment of the present invention. In contrast with the foot structure shown in FIGS. 10A and 10B, the foot structure of this preferred embodiment is characterized in that it further includes means for limiting the range of relative displacement of a first member 82 and a second member 84'''. More specifically, the second member 84''' has a large-diameter portion 84E having a diameter slightly smaller than the diameter of the hole 82C of the first member 82. Further, a ring 92 having a circular hole smaller in diameter than the large-diameter portion 84E of the second member 84''' and larger in diameter than the other portion of the second member 84''' is fixed to the lower end of the first member 82 by means of bolts 94.

With this structure, the upper limit of vertical movement of the second member 84''' is defined by the allowable range of elastic deformation of the rubber block 86, and the lower limit of the vertical movement is defined by the abutment of the lower end of the large-diameter portion 84E against the ring 92. Thus, the range of vertical displacement of the second member 84''' is limited to thereby prevent the escape of the second member 84''' from the first member 82. Further, since the diameter of the large-diameter portion 84E is slightly smaller than the diameter of the hole 82C of the first member 82, the second member 84''' can be vertically moved in the hole 82C with almost no play, thereby allowing stable supporting of the electronic apparatus 22.

Figure 14:
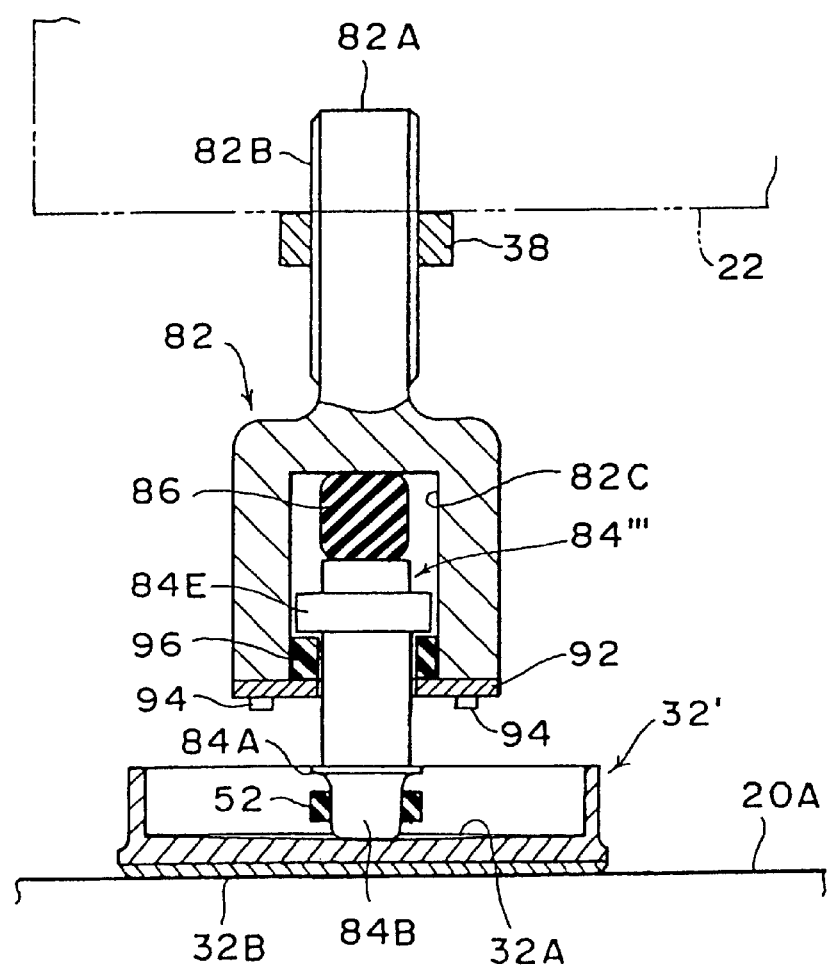
FIG. 14 is a sectional view of a foot structure showing a twelfth preferred embodiment of the present invention.

FIG. 14 is a sectional view of a foot structure showing a twelfth preferred embodiment of the present invention. In contrast with the foot structure shown in FIG. 13, the foot structure of this preferred embodiment is characterized in that it further includes a damping rubber ring 96 interposed between the lower end of the large-diameter portion 84E of the second member 84''' and the ring 92. With this structure, the damping rubber ring 96 functions to absorb an impact force when the large-diameter portion 84E of the second member 84''' is about to collide with the ring 92. Therefore, the shock is hardly applied to the electronic apparatus 22, and it is possible to prevent malfunction or the like of the electronic apparatus 22 when the vertical vibration isolating effect is exerted upon occurrence of an earthquake. The damping rubber ring 96 may have a small elastic coefficient so as to sufficiently damp the impact force.

While the first member has the hole for loosely engaging the second member in each preferred embodiment according to the third configuration of the present invention, the second member may have a hole for loosely engaging the first member.

Figure 15:
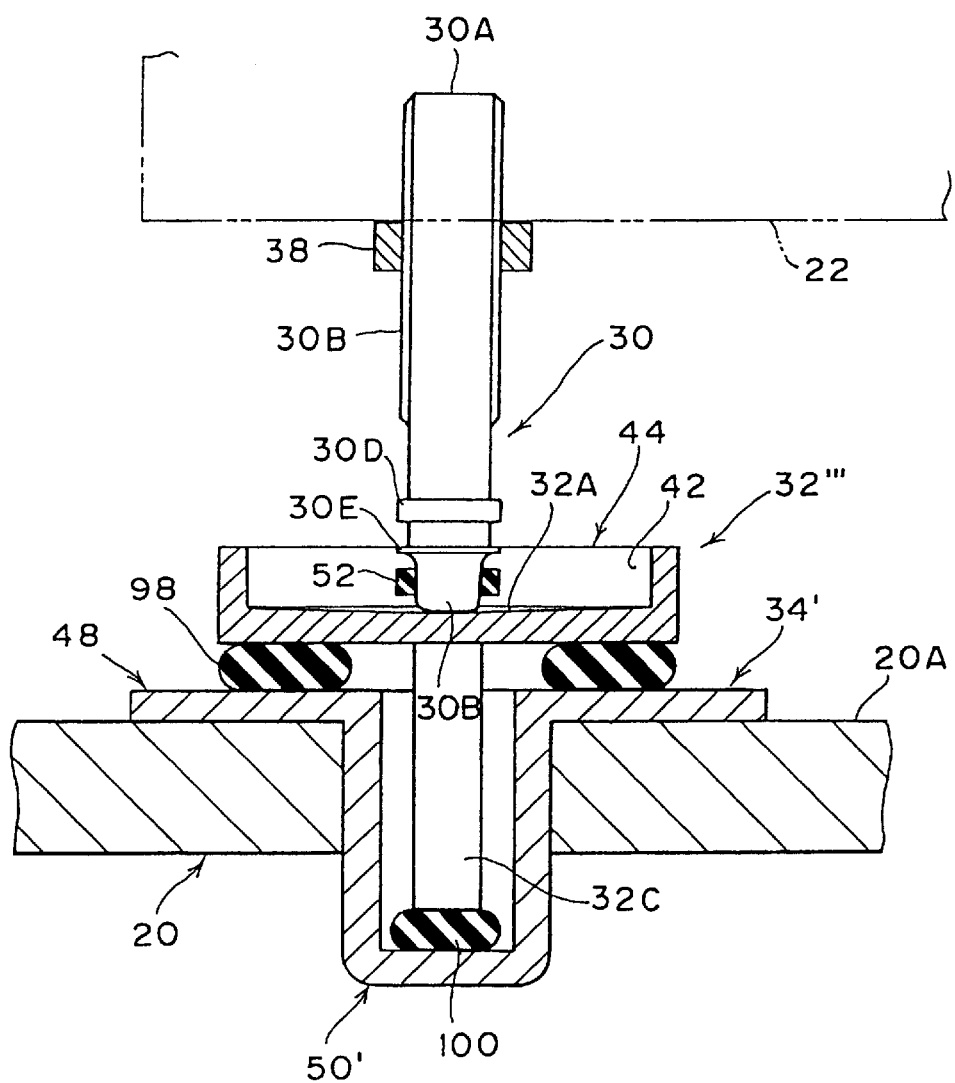
FIG. 15 is a sectional view of a foot structure showing a thirteenth preferred embodiment of the present invention.

FIG. 15 is a sectional view of a foot structure showing a thirteenth preferred embodiment of the present invention. In contrast with the foot structure shown in FIGS. 10A and 10B wherein the rubber block 86 as biasing means is provided in the bolt member 80 to produce a vertical vibration isolating effect, the foot structure of this preferred embodiment is characterized in that means for producing a vertical vibration isolating effect is provided on the floor side.

More specifically, the foot structure shown in FIG. 15 includes the bolt member 30 shown in FIG. 3, a slide cup 32''', and a flange member 34'. The slide cup 32''' has a configuration such that the liner 46 has been removed from the slide cup 32 shown in FIG. 3. Further, in contrast with the flange member 34 shown in FIG. 3, the flange member 34' is characterized in that a cylindrical portion 50' is closed at its lower end. A rubber ring 98 is interposed between the lower surface of the cup body 44 of the slide cup 32''' and the platelike portion 48 of the flange member 34', and a rubber block 100 is interposed between the lower end of the rodlike projection 32C of the slide cup 32''' and the bottom of the cylindrical portion 50' of the flange member 34'. FIG. 15 shows a condition where the rubber ring 98 and the rubber block 100 are compressed by the weight of the electronic apparatus 22.

By the provision of the rubber ring 98 and the rubber block 100, a vertical vibration isolating effect to the electronic apparatus 22 can be produced.

The present invention may be embodied by combining two or more of the above-mentioned preferred embodiments.

As described above, according to the first, second, or third configuration of the present invention, it is possible to obtain at least one of the first advantage that the range of displacement of the apparatus relative to the floor surface can be limited, the second advantage that the vertical vibration isolating effect to the apparatus can be produced, and the third advantage that the escape of the bolt member from the slide cup can be suppressed.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A foot structure for an apparatus, comprising:

a support member for oscillatably supporting said apparatus, and a hollow cylindrical elastic member for connecting said apparatus and a substantially horizontal floor surface, wherein said support member includes a bolt member having a first end and a second end, said first end being non-movably fixed perpendicular to said apparatus, and a slide cup having at its upper portion a recess having a length greater than a width of the second end of the bolt member, for slidably supporting said second end of said bolt member along the length, and having at its lower portion a lower surface contacting said floor surface, wherein said apparatus is oscillatable relative to said floor surface, wherein said slide cup is fixed to said floor surface, and said elastic member is fixed at its upper end and lower end to said apparatus and said slide cup, respectively, and wherein said elastic member is spaced from the support member such that the support member does not contact the elastic member, when said apparatus is oscillated relative to the floor surface.

* * * * *